US010267405B2

(12) United States Patent
Dell (10) Patent No.: US 10,267,405 B2
(45) Date of Patent: Apr. 23, 2019

(54) ISOLATOR WITH IMPROVED DAMPING STRUCTURE

(71) Applicant: LITENS AUTOMOTIVE PARTNERSHIP, Woodbridge (CA)

(72) Inventor: James W. Dell, Newmarket (CA)

(73) Assignee: Litens Automotive Partnership, Woodbridge (CA)

(*) Notice: Subject to any disclaimer, the term of this patent is extended or adjusted under 35 U.S.C. 154(b) by 0 days.

(21) Appl. No.: 14/898,997

(22) PCT Filed: Jul. 24, 2014

(86) PCT No.: PCT/CA2014/000592
§ 371 (c)(1),
(2) Date: Dec. 16, 2015

(87) PCT Pub. No.: WO2015/010190
PCT Pub. Date: Jan. 29, 2015

(65) Prior Publication Data
US 2016/0146328 A1 May 26, 2016

Related U.S. Application Data

(60) Provisional application No. 61/858,030, filed on Jul. 24, 2013.

(51) Int. Cl.
*B60K 25/02* (2006.01)
*F16H 55/36* (2006.01)

(52) U.S. Cl.
CPC ............ *F16H 55/36* (2013.01); *B60K 25/02* (2013.01); *B60K 2025/022* (2013.01); *F16H 2055/366* (2013.01)

(58) Field of Classification Search
CPC .. F16H 2055/366; F16H 55/36; F16F 15/123; F16D 7/022; F02B 67/06
(Continued)

(56) References Cited

U.S. PATENT DOCUMENTS 306,267 A * 10/1884 La Turno ............ F16F 15/1234
464/67.1
447,447 A * 3/1891 Daily .................. F16H 61/6647
474/94
(Continued)

FOREIGN PATENT DOCUMENTS

CA 2753767 A1 9/2010
CA 2802116 A1 12/2011
(Continued)

OTHER PUBLICATIONS

Office Action for CN201480041438.2 dated Mar. 2, 2017.
(Continued)

*Primary Examiner* — Henry Y Liu
(74) *Attorney, Agent, or Firm* — Millman IP Inc.

(57) ABSTRACT

In an aspect, an isolator is provided for isolating torsional vibration between a crankshaft of an engine and an endless drive member. The isolator includes a driver drivable by the crankshaft, a pulley that is engageable with an endless drive member, at least one isolation spring that is positioned to transfer forces between the driver and the pulley and to isolate torsional vibrations in the driver and the pulley from one another, and a damping structure configured to frictionally resist relative movement between the driver and the pulley beyond a selected relative threshold angle, and to permit relative movement between the driver and the pulley within the selected relative threshold angle without frictional resistance from the damping structure.

14 Claims, 9 Drawing Sheets

(58) Field of Classification Search
USPC .......................................................... 474/94
See application file for complete search history.

(56) References Cited

U.S. PATENT DOCUMENTS

| | | | |
|---|---|---|---|
| 608,770 A * | 8/1898 | Godfray | F16F 15/1234 464/67.1 |
| 1,254,542 A * | 1/1918 | Schwinn | F16D 3/66 222/360 |
| 1,518,360 A * | 12/1924 | Royce | F01L 1/02 192/55.61 |
| 3,556,273 A * | 1/1971 | Paul Maucher | F16F 15/1238 192/214 |
| 3,666,021 A | 5/1972 | Whitehouse | |
| 4,092,837 A | 6/1978 | Gebauer et al. | |
| 4,483,685 A | 11/1984 | Spasiano et al. | |
| 4,591,868 A | 5/1986 | Cusey et al. | |
| 4,613,029 A * | 9/1986 | Beccaris | F16F 15/12333 192/210 |
| 4,690,256 A | 9/1987 | Bopp et al. | |
| 5,048,657 A | 9/1991 | Dissett et al. | |
| 5,065,642 A * | 11/1991 | Kagiyama | F16F 15/137 192/205 |
| 5,380,248 A * | 1/1995 | Kraus | F16F 15/1343 464/66.1 |
| 5,619,887 A * | 4/1997 | Simpson | F01L 1/16 123/90.31 |
| 5,655,416 A * | 8/1997 | Mott | F01L 1/02 123/90.31 |
| 5,681,221 A * | 10/1997 | Albers | F16F 15/1343 192/213 |
| 5,893,355 A | 4/1999 | Glover et al. | |
| 5,964,674 A | 10/1999 | Serkh et al. | |
| 6,044,943 A * | 4/2000 | Bytzek | F16D 41/20 192/212 |
| 6,048,284 A * | 4/2000 | Gerhardt | F16F 15/1236 464/68.8 |
| 6,083,130 A | 7/2000 | Mevissen et al. | |
| 6,131,487 A * | 10/2000 | Jackel | F16F 15/1343 192/106 R |
| 6,161,512 A * | 12/2000 | Beels Van Heemstede | F16F 15/1232 123/192.1 |
| 6,244,577 B1 | 6/2001 | Bucholtz | |
| 6,308,678 B1 * | 10/2001 | Haas | F02B 67/08 123/192.1 |
| 6,354,413 B2 * | 3/2002 | Heller | F16F 15/1207 192/213 |
| 6,382,164 B2 * | 5/2002 | Haas | F02B 67/08 123/192.1 |
| 6,712,706 B2 * | 3/2004 | Jackel | F16F 1/13 192/214.1 |
| 7,153,227 B2 | 12/2006 | Dell et al. | |
| 7,204,772 B2 | 4/2007 | Huber | |
| 7,207,910 B2 | 4/2007 | Dell et al. | |
| 7,217,204 B2 | 5/2007 | Roby | |
| 7,510,062 B2 | 3/2009 | Derr | |
| 7,624,852 B2 * | 12/2009 | Mevissen | F16D 7/022 192/41 S |
| 7,708,661 B2 * | 5/2010 | Pflug | F16F 15/123 192/104 B |
| 7,878,315 B2 | 2/2011 | Saito et al. | |
| 7,891,475 B2 | 2/2011 | Zhu et al. | |
| 7,892,124 B2 | 2/2011 | Hodjat et al. | |
| 7,954,613 B2 * | 6/2011 | Mevissen | F16D 7/022 192/41 S |
| 7,998,008 B2 * | 8/2011 | Kamdem | F16D 41/206 474/161 |
| 8,021,253 B2 | 9/2011 | Dell et al. | |
| 8,028,602 B2 | 10/2011 | Crist | |
| 8,038,554 B2 | 10/2011 | Watababe et al. | |
| 8,192,312 B2 | 6/2012 | Ali et al. | |
| 8,276,720 B2 | 10/2012 | Farahati et al. | |
| 8,313,400 B2 | 10/2012 | Serkh et al. | |
| 8,317,642 B2 * | 11/2012 | Hartmann | F02B 63/04 464/160 |
| 8,419,574 B2 | 8/2013 | Serkh et al. | |
| 8,632,431 B2 * | 1/2014 | Pflug | F16H 55/36 474/94 |
| 8,641,563 B2 * | 2/2014 | Mende | F16F 15/1297 464/67.1 |
| 8,677,849 B2 * | 3/2014 | Simpson | F16F 15/1421 123/90.31 |
| 8,715,121 B2 * | 5/2014 | Cali | F16D 3/02 474/94 |
| 8,789,670 B2 * | 7/2014 | Antchak | F16D 7/022 192/212 |
| 8,863,925 B2 * | 10/2014 | Antchak | B60K 25/00 192/110 B |
| 9,163,713 B2 * | 10/2015 | Yoon | F16H 55/36 |
| 9,194,438 B2 * | 11/2015 | Dell | F16F 15/1232 |
| 9,347,498 B2 * | 5/2016 | Antchak | F16D 7/022 |
| 9,528,590 B2 * | 12/2016 | Mende | F16H 55/36 |
| 2002/0019263 A1 * | 2/2002 | Jackel | F16F 15/1343 464/67.1 |
| 2004/0014540 A1 | 1/2004 | Dell et al. | |
| 2004/0226393 A1 | 11/2004 | Hong | |
| 2006/0122014 A1 | 6/2006 | Kamdem | |
| 2006/0172832 A1 | 8/2006 | Watababe et al. | |
| 2006/0264280 A1 | 11/2006 | Dell et al. | |
| 2007/0037644 A1 * | 2/2007 | Mevissen | F16D 7/022 474/70 |
| 2008/0139351 A1 * | 6/2008 | Pflug | F16F 15/123 474/94 |
| 2008/0312014 A1 * | 12/2008 | Stief | F16F 15/123 474/94 |
| 2008/0318715 A1 * | 12/2008 | Pflug | F16H 55/36 474/100 |
| 2009/0022377 A1 | 1/2009 | Matsue et al. | |
| 2009/0107791 A1 * | 4/2009 | Zhu | F16D 41/22 192/70.14 |
| 2009/0121401 A1 * | 5/2009 | Lehmann | F16D 3/66 267/215 |
| 2009/0176583 A1 | 7/2009 | Dell et al. | |
| 2009/0194380 A1 | 8/2009 | Ali et al. | |
| 2009/0223775 A1 | 9/2009 | Hodjat et al. | |
| 2009/0305828 A1 * | 12/2009 | Rasche | F02B 67/06 474/94 |
| 2010/0032258 A1 * | 2/2010 | Mevissen | F16D 7/022 192/56.2 |
| 2010/0099527 A1 | 4/2010 | Rolando | |
| 2010/0120563 A1 | 5/2010 | Serkh et al. | |
| 2010/0167856 A1 * | 7/2010 | Hartmann | F02B 63/04 474/94 |
| 2011/0245000 A1 | 10/2011 | Serkh et al. | |
| 2011/0256968 A1 * | 10/2011 | Serkh | F16D 3/12 474/70 |
| 2011/0263365 A1 * | 10/2011 | Mende | F16F 15/1297 474/94 |
| 2011/0315502 A1 * | 12/2011 | Antchak | F16D 7/022 192/75 |
| 2012/0015768 A1 | 1/2012 | Serkh et al. | |
| 2012/0088616 A1 * | 4/2012 | Ali | F16F 15/121 474/94 |
| 2012/0094791 A1 * | 4/2012 | Lee | F16F 15/126 474/94 |
| 2012/0149511 A1 * | 6/2012 | Hodjat | F16D 3/10 474/94 |
| 2013/0098733 A1 * | 4/2013 | Antchak | B60K 25/00 192/41 S |
| 2015/0024885 A1 * | 1/2015 | Odenmarck | F16H 55/36 474/94 |
| 2015/0226309 A1 * | 8/2015 | Marion | B60K 25/02 474/94 |
| 2015/0252886 A1 * | 9/2015 | Cali | F16D 3/02 474/94 |
| 2015/0260233 A1 * | 9/2015 | Boyes | F16H 55/36 474/94 |
| 2015/0316138 A1 * | 11/2015 | Dell | B60K 25/02 474/91 |

(56) References Cited

U.S. PATENT DOCUMENTS

| | | | |
|---|---|---|---|
| 2016/0123453 A1* | 5/2016 | Starodoubov | B60K 25/02 474/94 |
| 2016/0138699 A1* | 5/2016 | Dell | B60K 25/02 474/94 |
| 2016/0146328 A1* | 5/2016 | Dell | F16H 55/36 474/94 |
| 2016/0153519 A1* | 6/2016 | Yoon | F16F 15/123 474/94 |
| 2016/0201757 A1* | 7/2016 | Tran | B60K 25/02 474/94 |

FOREIGN PATENT DOCUMENTS

| | | |
|---|---|---|
| CN | 101275612 A | 10/2008 |
| CN | 101915298 A | 12/2010 |
| CN | 102341610 A | 2/2012 |
| DE | 21202 | 4/1961 |
| DE | 4424988 C1 | 6/1995 |
| DE | 19730001 A1 | 1/1999 |
| DE | 19912970 A1 | 9/1999 |
| DE | 19919449 A1 | 11/1999 |
| DE | 102005016897 A1 | 10/2006 |
| DE | 102005062318 A1 | 7/2007 |
| DE | 102006039362 A1 | 3/2008 |
| DE | 102007058018 A1 | 7/2008 |
| DE | 102008059263 A1 | 6/2009 |
| DE | 102009039989 A1 | 4/2010 |
| DE | 102009052058 A1 | 6/2010 |
| DE | 102010023714 A1 | 1/2011 |
| EP | 0349267 A1 | 6/1989 |
| EP | 0934843 B1 | 5/2004 |
| EP | 1645783 A1 | 4/2006 |
| EP | 1662161 A1 | 5/2006 |
| EP | 01710465 A1 | 11/2006 |
| EP | 1621796 B1 | 10/2007 |
| EP | 1939494 A2 | 7/2008 |
| EP | 2148109 A1 | 1/2010 |
| EP | 2255100 A1 | 12/2010 |
| EP | 2273144 A1 | 1/2011 |
| EP | 2235400 A4 | 6/2011 |
| EP | 1621796 B2 | 10/2011 |
| EP | 2203655 B1 | 3/2012 |
| EP | 2638304 A1 | 9/2013 |
| EP | 2556274 B1 | 5/2014 |
| EP | 2558749 B1 | 6/2014 |
| EP | 2010792 B1 | 3/2015 |
| GB | 2308173 A | 6/1997 |
| KR | 1020110131197 A | 12/2011 |
| WO | 9110075 A1 | 7/1991 |
| WO | 9612122 A1 | 4/1996 |
| WO | 9821062 A1 | 5/1998 |
| WO | 03046407 A1 | 6/2003 |
| WO | 2005005865 A1 | 1/2005 |
| WO | 2005028899 A1 | 3/2005 |
| WO | 2007074016 A1 | 7/2007 |
| WO | 2007077414 A1 | 7/2007 |
| WO | 2007077415 A1 | 7/2007 |
| WO | 2007121582 A1 | 11/2007 |
| WO | 2008002845 A2 | 1/2008 |
| WO | 2008022897 A1 | 2/2008 |
| WO | 2008049388 A2 | 5/2008 |
| WO | 2008058499 A2 | 5/2008 |
| WO | 2008067915 A1 | 6/2008 |
| WO | 2008071306 A1 | 6/2008 |
| WO | 2009099504 A2 | 8/2009 |
| WO | 2009111036 A1 | 9/2009 |
| WO | 2010005880 A1 | 1/2010 |
| WO | 2010099605 A1 | 9/2010 |
| WO | 2011126916 A1 | 10/2011 |
| WO | 2011130106 A1 | 10/2011 |
| WO | 2011160215 A1 | 12/2011 |
| WO | 2012009314 A1 | 1/2012 |
| WO | 2012061930 A1 | 5/2012 |
| WO | 2012082479 A1 | 6/2012 |
| WO | 2012033825 A1 | 3/2013 |
| WO | 2013124009 A1 | 8/2013 |
| WO | 2014186876 A1 | 11/2014 |

OTHER PUBLICATIONS

Office Action for CN201480041438.2 dated Mar. 2, 2017—English translation.
Reporting letter for Office Action for CN201480041438.2 dated Mar. 28, 2017.
Extend European search report for EP3025072 dated Feb. 17, 2017.
Office Action for CN201380053505.8 dated Feb. 23, 2017.
Office Action for CN201380053505.8 dated Feb. 23, 2017, English translation.
International Search Report for PCT/CA2014/000592, dated Oct. 29, 2014, ISA.
Written Opinion for PCT/CA2014/000592, dated Oct. 29, 2014, ISA.
Installation Instructions for KPMI Part No. 90/9034 BMW (Lightweight Racing Vale Spring Kit), 1970, Kibblewhite Precision Machining, Inc.
International Preliminary Report on Patentability for PCT/CA2013/000881 dated Apr. 15, 2015.
English translation of Office Action for CN201380053505.8 dated Apr. 12, 2016.
International Search Report and Written Opinion for PCT/CA2014/000456 dated Sep. 3, 2014.
International Search Report for PCT/CA2013/000881 dated Jan. 28, 2014.
Office Action for CN201380053505.8 dated Apr. 12, 2016.
Office Action for U.S. Appl. No. 14/470,937 dated Jan. 29, 2016.
Chinese Office Action for CN201480041408.1 dated Feb. 28, 2018.
English Translation of the form in the Chinese Office Action of CN201480041408.1 dated Feb. 28, 2018.
English Translation of the text in Chinese Office Action for CN201480041408.1 dated Feb. 28, 2018.
Chinese Office Action for CN201480061550.2 dated Dec. 5, 2017.
English Translation of Chinese Office Action for CN201480061550.2 dated Dec. 5, 2017.
Office Action for U.S. Appl. No. 15/035,688 dated Jul. 12, 2018.
Extended European Search Report for EP103806 dated Jul. 7, 2017.
Extended European Search Report for EP14859575 dated Jun. 6, 2017.
Office Action for CN201480029125.5 dated Jul. 24, 2017.
Office Action for CN201480029125.5 dated Jul. 24, 2017—English Translation.
Office Action for CN201480041408.1 dated Aug. 21, 2017.
Office Action for CN201480041408.1 dated Aug. 21, 2017—English Translation.
Office Action for CN201480041408.1 dated Sep. 27, 2018.
Office Action for CN201480041408.1 dated Sep. 27, 2018—English translation.

* cited by examiner

ISOLATOR WITH IMPROVED DAMPING STRUCTURE

CROSS-REFERENCE TO RELATED APPLICATIONS

This application claims the benefit of U.S. Provisional Patent Application No. 61/858,172, filed Jul. 25, 2013, the contents of which are incorporated by reference as if fully set forth in detail herein.

FIELD

The present invention relates to isolators and in particular isolators for use between the engine crankshaft and an endless drive member such as a belt.

BACKGROUND

An isolator is usually used for isolating a crankshaft pulley and its associated belt (e.g. an accessory drive belt) from torsional vibration from the crankshaft that is a result of reciprocation of masses (e.g. pistons) in an internal combustion engine, and in particular engines with certain cylinder counts such as four-or-three cylinder engines, and diesel engines. Such isolators are useful, however, there is a continued need to improve the isolation provided by such devices, so as to reduce the amount of force transmitted to the pulley (and therefore to the accessory drive belt).

There is separately a continued need to reduce the parts count that a manufacturer must maintain in inventory when building a vehicle or in building a component of a vehicle such as an isolator.

SUMMARY

In an aspect, an isolator is provided for isolating torsional vibration between a crankshaft of an engine and an endless drive member. The isolator includes a driver drivable by the crankshaft, a pulley that is engageable with an endless drive member, at least one isolation spring that is positioned to transfer forces between the driver and the pulley and to isolate torsional vibrations in the driver and the pulley from one another, and a damping structure configured to frictionally resist relative movement between the driver and the pulley beyond a selected relative threshold angle, and to permit relative movement between the driver and the pulley within the selected relative threshold angle without frictional resistance from the damping structure.

In another aspect, an isolator is provided for isolating torsional vibration between an input member and an output member. The isolator includes a driver that is engageable with one of the input and output members, a pulley that is engageable with the other of the input and output members, at least one isolator spring, and a spring shell. The driver engages one end of at least one isolation spring. The pulley engages the other end of the at least one isolation spring such that torque is transmitted between the driver and the pulley through the at least one isolation spring. The spring shell at least partially surrounds the at least one isolation spring. The spring shell includes a first spring shell portion and a second spring shell portion. Each spring shell portion includes a spring shell portion body at least one clip member and at least one clip receiving shoulder positioned 180 degrees from the at least one clip member and configured to lockingly receive the at least one clip member from the other spring shell portion.

In yet another aspect, an isolator is provided for isolating torsional vibration between an input member and an output member. The isolator includes a driver that is engageable with one of the input and output members, a pulley that is engageable with the other of the input and output members, at least one isolation spring that is positioned to transfer forces between the driver and the pulley and to isolate torsional vibrations in the driver and the pulley from one another, and a damping structure configured to frictionally resist relative movement between the driver and the pulley that is beyond a selected relative threshold angle, and to permit relative movement between the driver and the pulley within the selected relative threshold angle without frictional resistance from the damping structure.

Other features and advantages will be apparent by following the description with references to the drawings.

BRIEF DESCRIPTION ON THE DRAWINGS

The foregoing and other aspects of the disclosure will be more readily appreciated by reference to the accompanying drawings, wherein:

FIGS. 2 and 3 are perspective exploded views of the isolator shown in FIG. 1a;

FIGS. 4 and 5 are perspective cross-sectional views of the isolator shown in FIG. 1a;

FIG. 6 is a perspective exploded view of a spring shell and spring that are part of the isolator shown in FIG. 1a;

FIG. 9 is a graph illustrating the torque v. displacement relationship for the isolator shown in FIG. 1a.

DETAILED DESCRIPTION OF EMBODIMENTS

Figure 1:
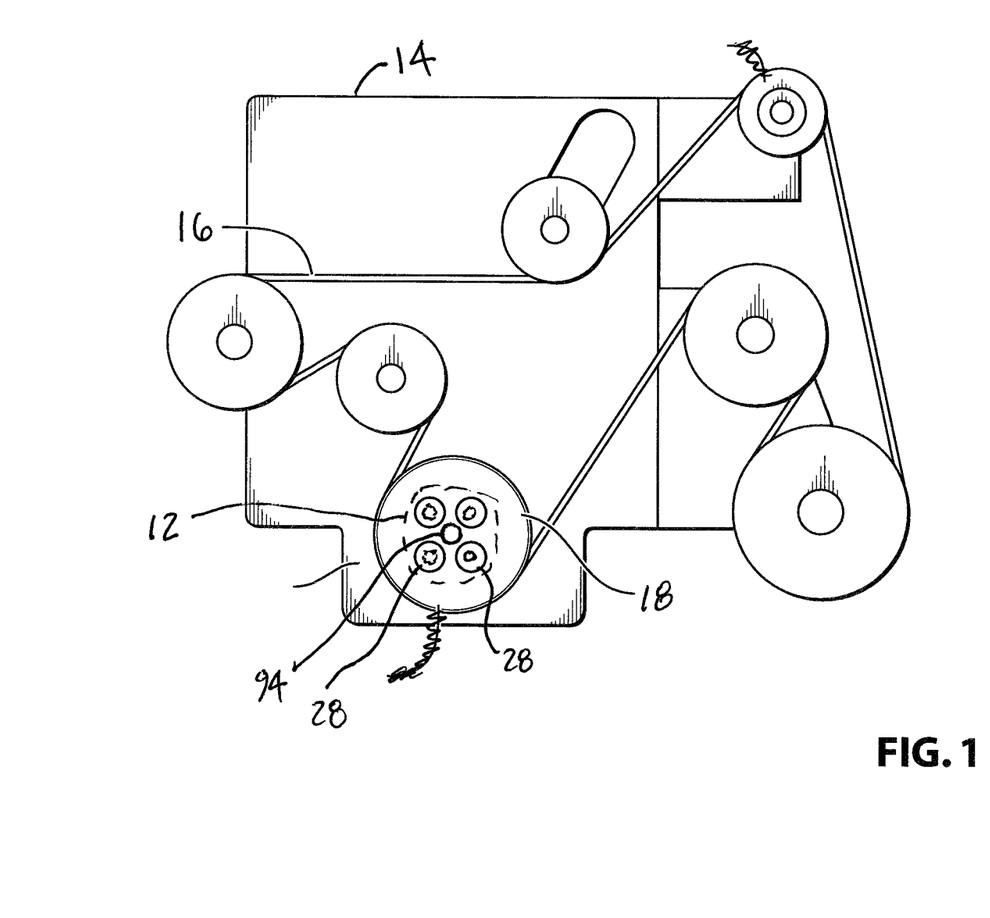
FIG. 1 is an elevation view of an engine with a crankshaft, a driven belt and an isolator in accordance with an embodiment of the present invention.

Reference is made to FIG. 1, which shows an isolator 10 for transferring power between a crankshaft 12 on an engine 14 and an endless drive member 16, such as an accessory drive belt, in accordance with an embodiment of the present invention. The isolator 10 isolates the endless drive member 16 from vibrations or other sudden changes in torque in the crankshaft 12, and vice versa.

Figure 2:
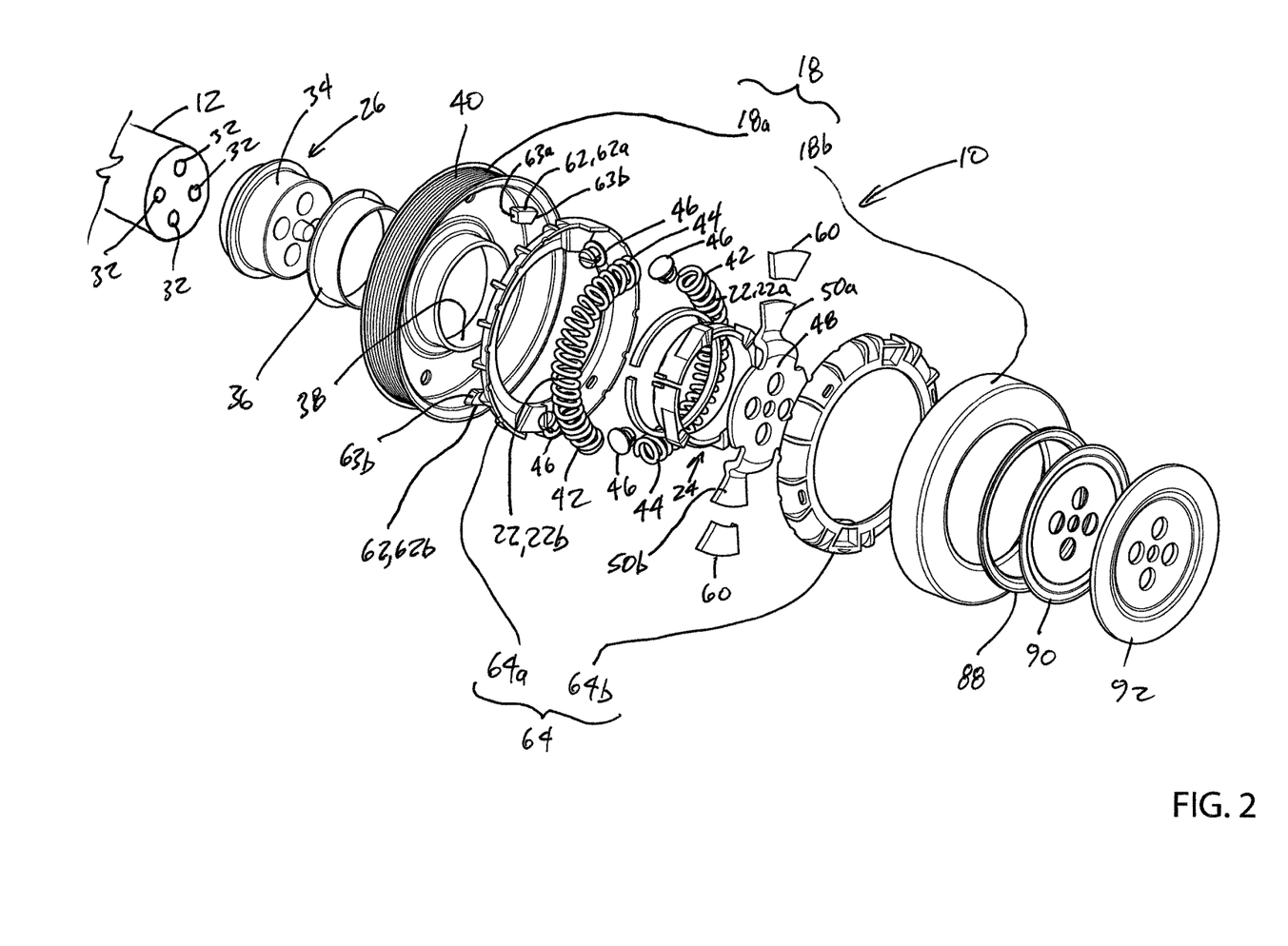
Figure 3:
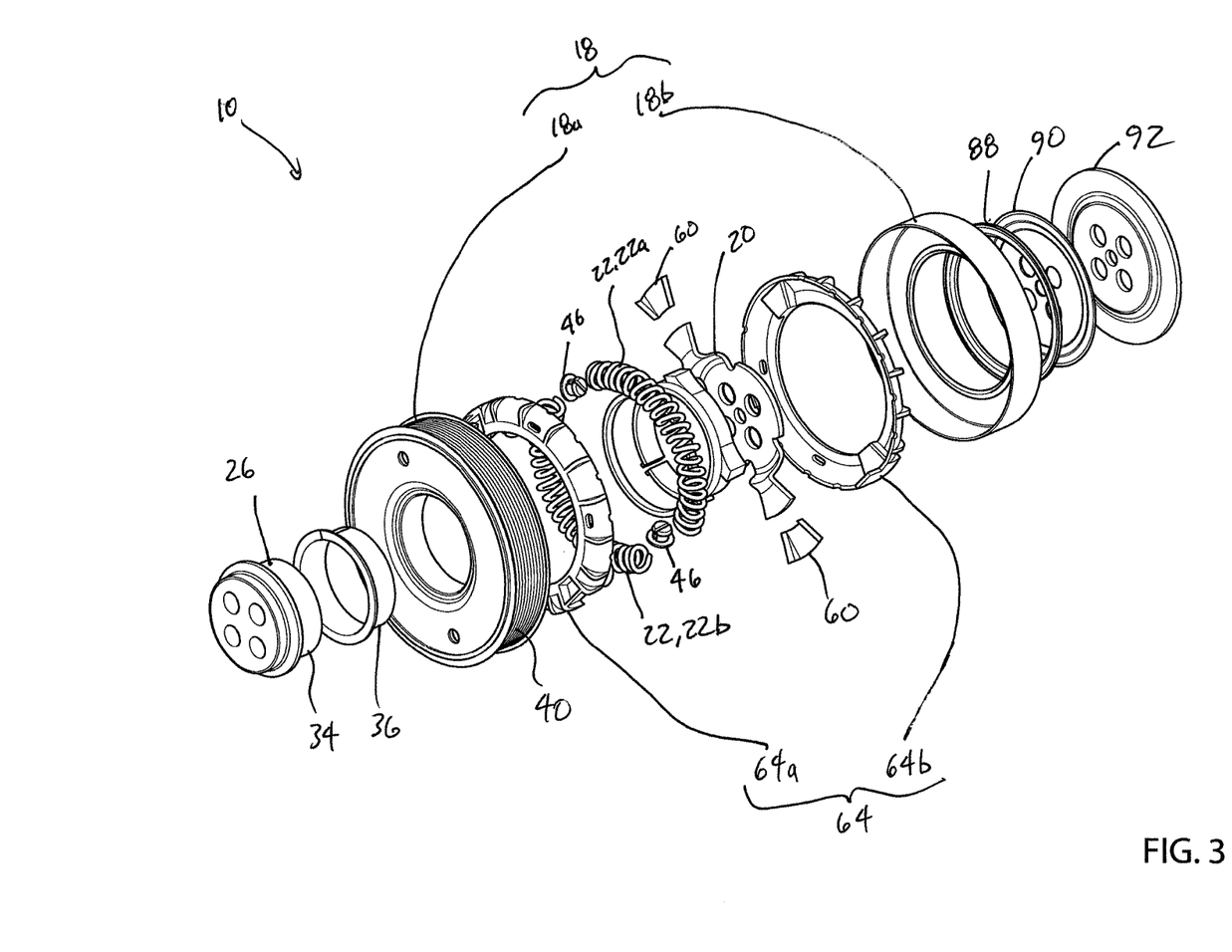

As seen in FIGS. 2 and 3, the isolator 10 includes a pulley 18, a driver 20, first and second isolation springs 22 (shown individually at 22a and 22b), and a damping structure 24.

The driver 20 is fixedly mountable in any suitable way to the crankshaft 12 for rotation about an axis A. For example, a shaft adapter 26 may be provided that mounts to the crankshaft 12 via a plurality of threaded fasteners (shown at 28 in FIG. 1) such as four spline socket head cap screws that pass through apertures in the adapter 26 and into threaded apertures 32 in the end of the crankshaft 12.

The driver 20 may be made from any suitable material such as a suitable metal, such as steel.

The shaft adapter 26 may include a support surface 34 for supporting a bushing 36 that in turn supports a bushing engagement surface 38 on the pulley 18 so as to permit relative rotation between the pulley 18 and the crankshaft 12, the shaft adapter 26 and the driver 20. The bushing 36 may also include a radial lip that acts as a thrust bushing portion that is engaged by and supports the pulley 18 in the axial direction. The bushing 36 may be made from any suitable material such as nylon.

The pulley 18 is supported for rotation relative to the crankshaft 12 and is engageable with the belt 16. It will be noted that the term 'belt' is used for convenience, but instead it may be any suitable endless drive member. Analogously, the term 'pulley' is used for convenience, but instead it may be any suitable rotary member that is engageable with the endless drive member.

The pulley 18, in the embodiment shown has a belt engagement surface 40 that is configured to engage a poly-V groove belt. The pulley 18 may be made from two elements including a main portion 18a and a cover member 18b that is connected to the main portion 18a via any suitable means (e.g. by means of a press-fit). The pulley 18 may be made from any suitable material such as a suitable metal, such as steel.

The springs 22 elastically deform to isolate the endless drive member 16 and the crankshaft 12 from vibrations or other sudden changes in torque in one another. The springs 22 in the examples shown are arcuate, helical coil compression springs. However, any other suitable type of springs could be used, such as, for example, closed cell foam springs.

While two springs 22 are shown in the figures, it will be understood that an isolator having a damping structure that has a selected amount of clearance with the driver 20 providing the advantages described herein could be provided with a single spring 22, or with three or more springs.

The springs 22 each have a first end 42 and a second end 44. Each of the first and second ends 42 and 44 may optionally have a spring end bumper 46 thereon, which may be made from any suitable material such as nylon, to reduce the sound of impact between the end 42 or 44 and whichever of the driver 20 and the pulley 18 the end 42 or 44 is engaged with.

Engagement between the springs 22 and the driver 20 and the pulley 18 described as follows. The driver 20 has a central body 48, a first arm 50a and a second arm 50b. The driver 20 has a first spring engagement surface 52 on a first side 54 of each of the first and second arms 50a and 50b. The first spring engagement surfaces 52 are engageable with the first spring ends 42 of the springs 22 so as to transfer torque therebetween. The driver 20 has a second spring engagement surface 56 on a second side 58 of each of the first and second arms 50a and 50b. The second spring engagement surfaces 56 are engageable with the second spring ends 44 of the springs 22.

The driver 20 is shown as having an optional driver bumper 60 on each of the arms 50a and 50b so that all of the drive surfaces 52 and 56 are covered. Thus, engagement between the driver 20 and the springs 22 takes place through the bumpers 60 and 46. The bumpers 60 may be made from any suitable material such as nylon.

As shown in FIGS. 2 and 3, the pulley 18 has first and second lugs 62 (shown individually at 62a and 62b) thereon. The lugs 62 may be separate members that have projections that extend through apertures in the main portion 18a of the pulley 18 and that are welded to the main portion 18a to become integral therewith.

Figure 4:
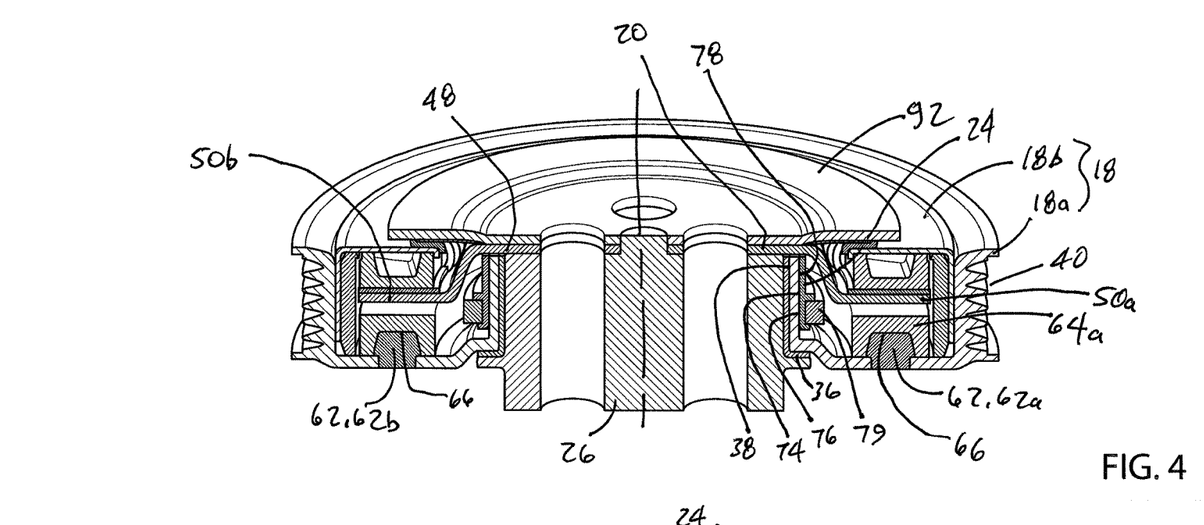

The lugs 62 have first and second spring end engagement surfaces thereon 63a and 63b (FIG. 2), which are engageable with the first and second ends 42 and 44 of the springs 22 through an optionally provided spring shell 64. The spring shell 64 is provided in surrounding relationship with the springs 22 and prevents metal-to-metal contact between the springs 22 and the pulley 18 in embodiments wherein the springs 22 and pulley 18 are both metallic. The spring shell 64 may be fixedly mounted to the pulley 18 for movement therewith. To achieve this, the spring shell 64 may fit tightly between the main pulley portion 18a and the cover member 18b. The spring shell 64 may further include two lug receiving portions 66 (FIGS. 3 and 4) that are positioned to snugly receive the lugs 62, so that the spring shell 64 is rotationally fixed to the pulley 18. In addition, the spring shell 64 has first and second spring engagement surfaces 68a and 68b thereon that engage the ends 42 and 44 of the springs 22. Thus, the spring shell 64 transfers forces between the springs 22 and the pulley 18.

Figure 6:
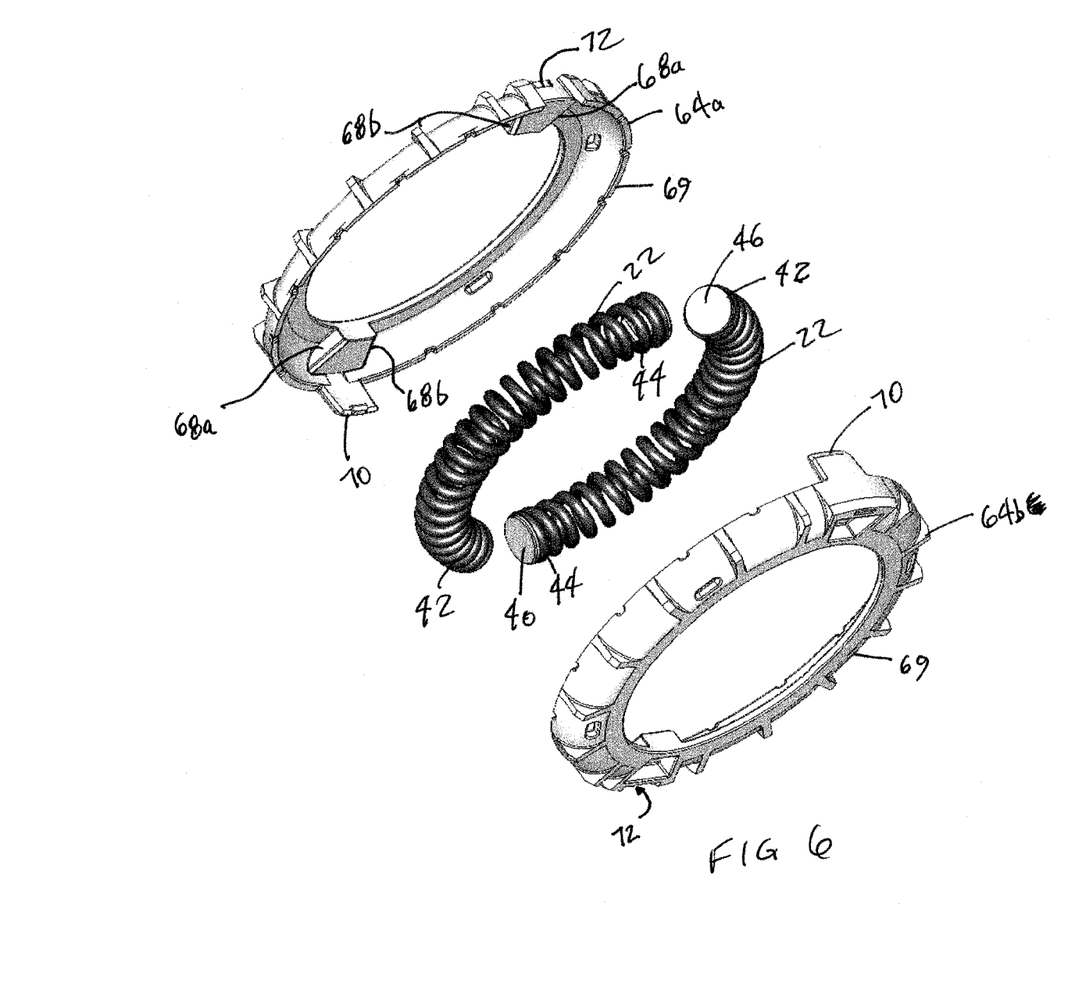

Referring to FIG. 6, the spring shell 64 may be made from two spring shell portions 64a and 64b, which are assembled together without the use of separate fasteners or tools. The two portions, in the embodiment shown, are identical, thereby reducing the number of individual parts that are kept in inventory for the manufacture of the isolator 10. In the embodiment shown, each spring shell portion 64a and 64b includes a spring shell portion body 69 that partly encapsulates the springs 22. Each spring shell portion 64a and 64b further includes at least one clip member 70 on the body 69, and at least one clip receiving shoulder 72 on the body 69 but spaced 180 degrees apart from the clip member 70 and configured to lockingly receive the at least one clip member from the other spring shell portion.

By assembling them together in such a way that the clip member 70 of each of the shell portions 64a or 64b connects to the clip receiving shoulder 72, these two identical members 64a and 64b can have a snap-fit connection to each other without tools or separate fasteners.

While each spring shell portion 64a and 64b is shown as having one clip member 70 and one clip receiving shoulder 72, it is optionally possible to provide a plurality of clip members 70, wherein for each clip member there is a clip receiving shoulder 72 positioned 180 degrees from the associated clip member 70.

Figure 5:
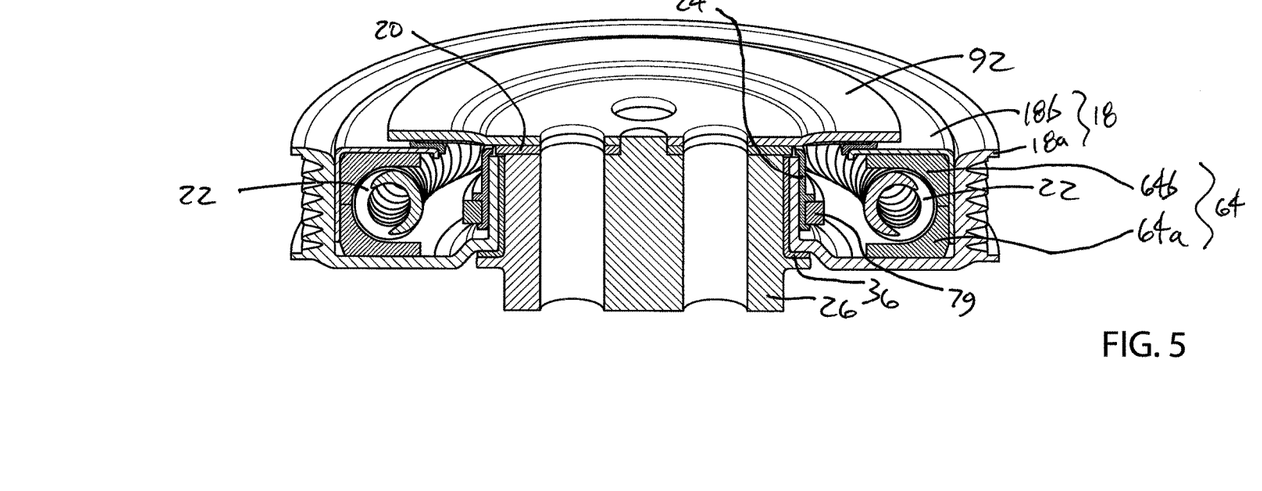

During operation of the isolator 10, it will be noted that the spring shell 64, which is surrounded on both axial sides as shown in FIG. 5, may be made from a suitable material such as nylon. The spring shell 64 may be configured to undergo thermal expansion relative to the pulley 18 during operation of the isolator 10, which strengthens the engagement of the spring shell 64 with the pulley 18, so as to increase the surface areas of the spring shell 64 and pulley 18 through which torque is transferred.

The springs 22 may be preloaded so that when the engine is off and no torque is being transferred from the crankshaft 12 to the pulley 18 or vice versa, the springs 22 will be in a state of compression. This may be referred to sometimes as the 'no-load' state of the isolator 10. In the no-load state, the arms 50a and 50b are generally aligned with the lugs 62a and 62b on the pulley 18. Put another way, when no torque is being transferred, the driver 20 has a selected alignment with the pulley 18. During operation of the isolator 10, torque is exerted on the driver 20 from the crankshaft 12, through the shaft adapter 26. The driver arms 50a and 50b in turn exert a force on the first ends 42 of the springs 22 and the driver 20 pivots relative to the pulley 18 such that the arms 50a and 50b are no longer in alignment with the lugs 62a and 62b. The force is transferred through the springs 22 and from the second ends 44 of the springs 22 into the pulley 18 through the spring shell 64. Inertia in the pulley 18, inertia arising from the engagement of the pulley 18 with the belt 16 (FIG. 1), causes the driver 20 to compress the springs 22 by some amount, before sufficient force is developed to move the pulley 18. Furthermore, even during steady state conditions of torque transfer the springs 22 will be in a compressed state, wherein the amount of compression of the springs 22 (and therefore the amount of angular offset between the driver 20 and the pulley 18 relative to the above mentioned selected alignment therebetween) is related to the amount of force being transferred through the springs 22.

The damping structure 24 is configured to frictionally resist relative movement between the driver 20 and the pulley 18 that is beyond a selected relative threshold angle, and to permit relative movement between the driver 20 and the pulley without frictional resistance within the selected relative threshold angle. In other words, the damping structure 24 will not impose frictional resistance on any relative movement between the driver 20 and the pulley 18 of less than a selected threshold angle. However, the damping structure 24 will impose frictional resistance to relative movement between the driver 20 and the pulley 18 of more than the selected threshold angle.

Figure 7:
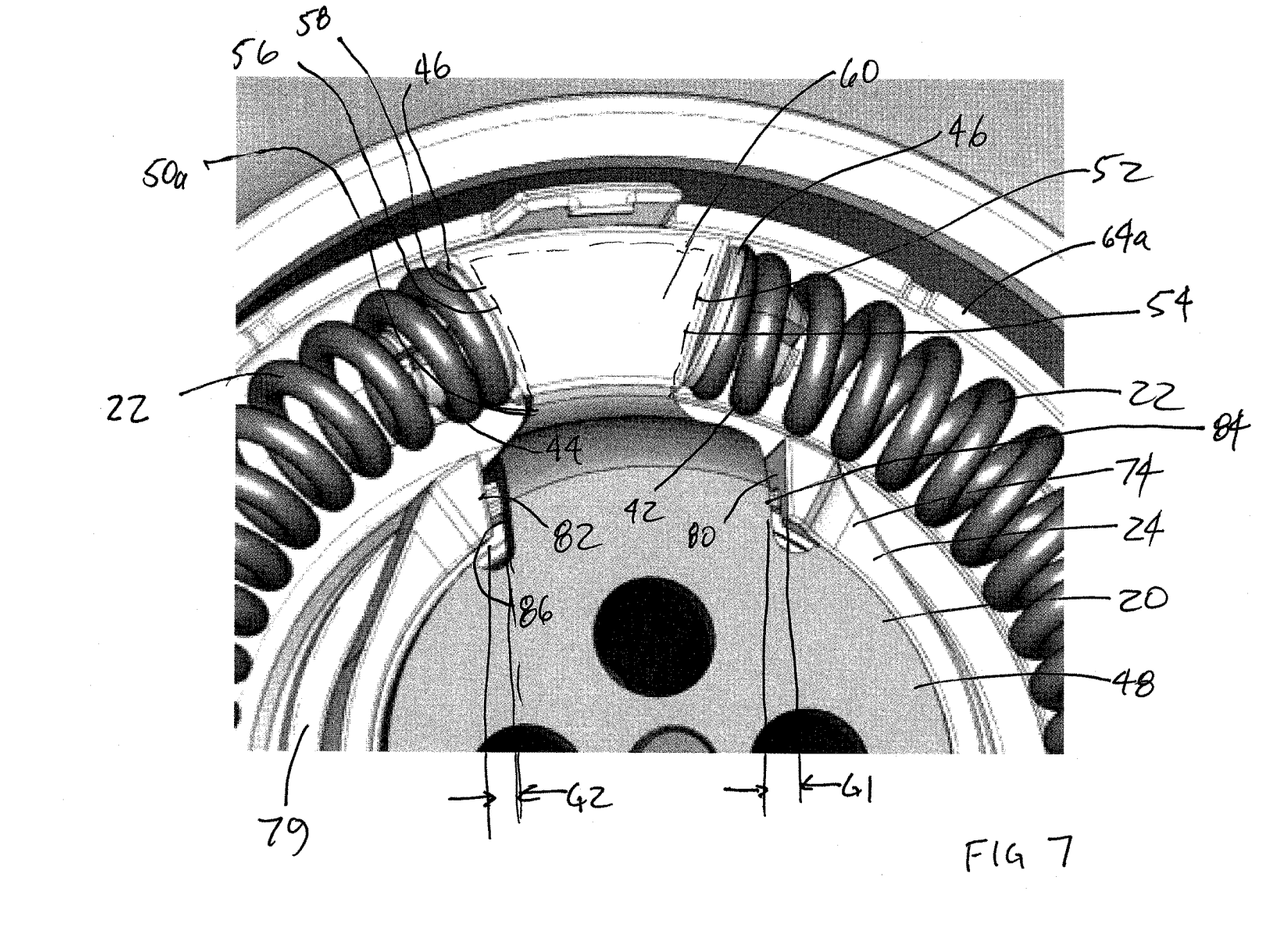
FIG. 7 is a magnified elevation view of a portion of the isolator shown in FIG. 1a, illustrating an idle condition of the engine when no torque transfer is taking place through the isolator.

In the particular embodiment shown, the damping structure 24 includes a friction ring 74 that has a radially inner surface 76 that is frictionally engaged with a radially outer surface 78 of the pulley 18. A damping element spring 79 (which may, for example, be a single coil from a torsion spring) is engaged with the friction ring 74 and urges it into engagement with the surface 78 of the pulley 18 (FIGS. 4 and 5) with a selected force, thereby augmenting the frictional force therebetween to a selected frictional force. Referring to FIG. 7, the friction ring 74 further includes at least one first driver engagement face 80 (in the embodiment shown there are two engagement faces 80) and at least one second driver engagement face 82 (in the embodiment shown there are two engagement faces 82). The first and second driver engagement faces 80 and 82 are engageable with at least one first damping structure engagement face 84 (in the embodiment shown there are two engagement faces 84) on the driver 20 and at least one second damping structure engagement face 86 (in the embodiment shown there are two engagement faces 86) on the driver 20. It will be noted that the engagement faces 84 and 86 are provided on the sides 54 and 58 respectively of the driver arms 50a and 50b. Thus the driver arms 50a and 50b include both the damping structure engagement faces 84 and 86 respectively, and the spring engagement faces 52 and 56 respectively.

As shown in FIG. 7, there is a total angular clearance G between the driver 20 and the friction ring 74 which is made up of two angular clearances G1 and G2 on the two sides of the arms 50a and 50b with respect to the engagement faces 80 and 82 (i.e. between the engagement faces 84 and 86 and the engagement faces 80 and 82). Unless engaged by the driver 20, the friction ring 74 will remain frictionally engaged in some position relative to the pulley 18, thereby maintaining the angular clearances G1 and G2. By providing the angular clearances G1 and G2, during movement of the driver 20 relative to the pulley 18 within the aforementioned selected threshold angle (i.e. movement that is within the total angular clearance G), there is no engagement between the driver 20 and the friction ring 74 and therefore, the friction ring 74 does not move relative to the pulley 18. It will be understood that, while damping can be advantageous in certain situations, it does represent a force that is transmitted between the driver 20 and the pulley 18. Thus, by configuring the friction ring 74 to have the clearance G with the driver 20 the torsional vibrations that remain within the clearance G do not result in a damping force by the friction ring 74, thereby resulting in less of the fluctuating force transmitted from the driver 20 to the pulley 18.

For example, during idling of the engine 14, the driver 20 will move back and forth with a certain amplitude (e.g. between about 6 and 7 degrees in total) due to torsional vibration in the crankshaft 12 which naturally occurs in internal combustion engines. By selecting the total clearance G to be more (e.g. about 1 degree more) than the amplitude of the movement of the driver 20, there is no damping force transmitted between the driver 20 and the pulley 18 during idling. For example, the clearance G may be between about 7 and about 8 degrees in a case where the amplitude of the torsional vibrations mentioned above are between about 6 and 7 degrees.

Figure 8:
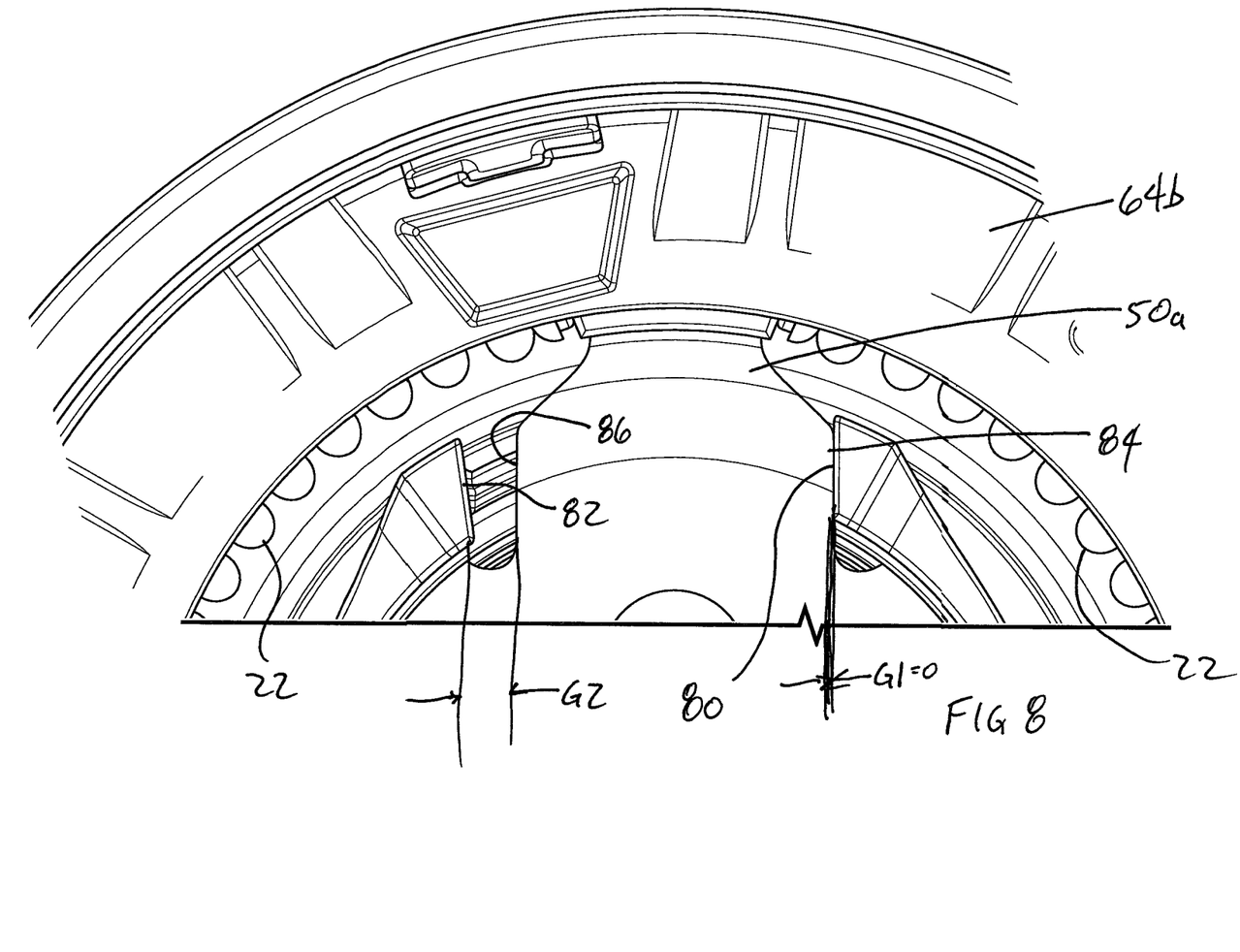
FIG. 8 is another magnified elevation view of a portion of the isolator shown in FIG. 1a, illustrating a condition of the engine in which torque transfer is taking place through the isolator.

FIG. 7 illustrates a situation when the engine 14 is off and there is therefore no load on the engine and no torque transfer between the engine 14 and the belt 16. When the engine 14 is turned on and is under some constant load (e.g. at idle with a certain number of accessories on), the driver 20 will rotate relative to the pulley 18 to a new position where they are offset by some angular amount that depends on the size of the load. Assuming that the rotation of the driver 20 is normally in the clockwise direction in the view shown in FIG. 7, the relative movement between the driver 20 and the pulley 18, if large enough, will consume whatever clearance G1 there was with the friction ring 74, such that the driver 20 will drive the friction ring 74 to move (clockwise) relative to the pulley 18. Initially when reaching the new position the driver 20 will be abutted with the engagement faces 80 on the friction ring 74, as shown in FIG. 8. However, as the crankshaft incurs torsional vibrations and transmits them to the driver 20, the driver 20 will nudge the friction ring 74 until there is no longer engagement between them. Thus a new equilibrium will be reached where there is again a non zero clearance G1 and G2 on each side of the driver 20 with respect to the friction ring 74, so that no damping force is transferred from the driver 20 to the pulley 18 through the friction ring 74. If the engine load is changed by some amount, (e.g. the driver turns the air conditioner off thereby decreasing the load, or the alternator turns on thereby increasing the load), the driver 20 would move as needed based on the amount of force that must be transferred to the pulley 18 to meet the load, and accordingly, the friction ring 64 would move as needed as the driver 20 reaches a new equilibrium position. Then, at the new equilibrium position, the driver 20 would incur torsional vibrations from the crankshaft 12 and would nudge the friction ring 74 until there would be sufficient clearance between the driver 20 and the friction ring 74 that there would not be any damping force exerted by the driver 20 to the pulley 18 through the friction ring 74.

The selected threshold angle (i.e. the clearance G) may be selected based on any suitable criteria. For example, it may be selected to be larger than the amplitude of the torsional vibration in the driver 20 and crankshaft 12 at idle. Alternatively it may be selected to be larger than the amplitude of the vibration in the driver 20 and crankshaft 12 under some other conditions. For example, if the engine is in a vehicle such as a tractor-trailer that is driven at constant speed and under a relatively constant accessory load for extended periods of time, the clearance G may be selected based on the amplitude of the torsional vibrations under those conditions.

In the embodiment shown, the isolator 10 further includes a seal member 88, a seal biasing member 90 and a dust shield 92. These cooperate to prevent leakage of lubricant (e.g. grease) out from the interior space of the pulley and to inhibit dust and debris from entering into the interior space of the isolator 10. The seal member 88 additionally acts as another thrust bushing which is urged into engagement with the pulley 18 (specifically the cover member 18b), by the seal biasing member 90, so as to urge the pulley 18 and the bushing 36 over to a datum point against a shoulder on the shaft adapter 26 at one end of the support surface 34. The dust shield 92 could instead be some other component such as a torsional vibration damper that is connected indirectly to the crankshaft 12 via the driver 20a and the shaft adapter 26 to reduce the amplitude of angular reciprocation of the crankshaft 12 during torsional vibration thereof, particularly at higher RPM.

It will be noted that, in the no-load state, the springs 22 may be disengaged radially from the spring shell 64, engaging the spring shell 64 only at the spring ends 42 and 44. During operation where there is torque transfer through the isolator 10 however, there may be frictional engagement between the springs 22 and the spring shell 64 as the springs 22 are further compressed from the no-load state.

Figure 1A:
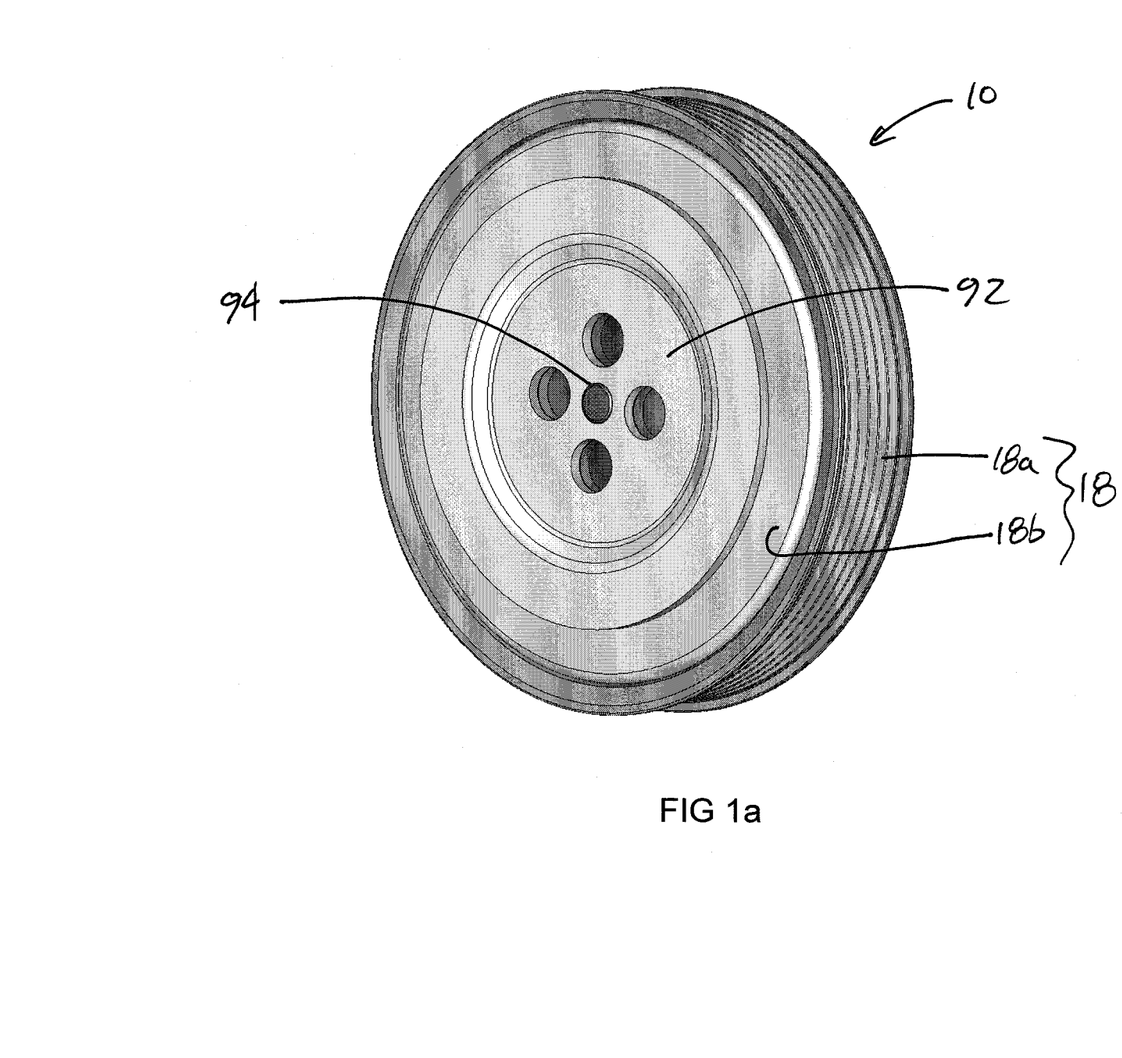
FIG. 1a is a perspective right-side view of the isolator shown in FIG. 1.

A projection 94 (FIG. 1a) on the shaft adapter 26 may be passed through apertures in the dust shield 92, the biasing member 90, and the driver 20 to ensure alignment of these components with the axis A. The projection 94 could be staked afterwards so that all these components remain mounted to the shaft adapter 26 to form a subassembly.

While the friction ring 74 is shown as being frictionally engaged with the pulley 18 and drivable by the driver 20, it will be understood that the friction ring 74 could alternatively be configured to be frictionally engaged with the driver 20 and be driven by the pulley 18.

While the friction ring 74 is a ring that encompasses a radially outer surface of the pulley 18, it will be understood that the friction ring 74 could alternatively be any other suitable type of friction member that frictionally engages a portion of the pulley 18 or a portion of the driver 20.

While the engine 14 may be a vehicular engine, it will be understood that it could be a stationary engine used for an industrial application or the like. The isolator 10 described herein may be particularly suited for certain types of engine such as an engine having low displacement (e.g. less than 2 liters) and/or a diesel engine.

In some embodiments, the angular spacing between the engagement surfaces 52 and 56 on each arm 50a and 50b (including the bumper 60 if provided) may be selected to be slightly different (e.g. larger) than the angular spacing between the engagement surfaces 68a and 68b on the spring shell 64a so as to stagger the engagement and release of the springs 22 with respect to these surfaces.

In the embodiment shown, it has been described for the isolator 10 to be installed on the crankshaft 12 of an engine 14. It will be noted that the isolator 10 could alternatively be installed on the shaft of an accessory that is driven by the belt 16, such as, for example on a shaft of a steering pump. In such an embodiment, torque transfer would generally occur from the pulley 18 to the driver 20 and shaft adapter 26 through the isolation springs 22. The driver 20, in such an embodiment, would drive the shaft of the accessory instead of driving the pulley 18. Put more broadly, the isolator 10 may be used on any engine for isolating between any suitable input member (such as a belt, or a crankshaft) and any suitable output member (such as an accessory input shaft, or a belt). Additionally, the driver 20 is just one example of a first rotary drive member, and the pulley is just one example of a second rotary drive member. For example, the pulley 18 could instead be a gear that drives a gear train and that is driven be the engine crankshaft via the driver 20 and through the isolation springs 22.

Figure 9:
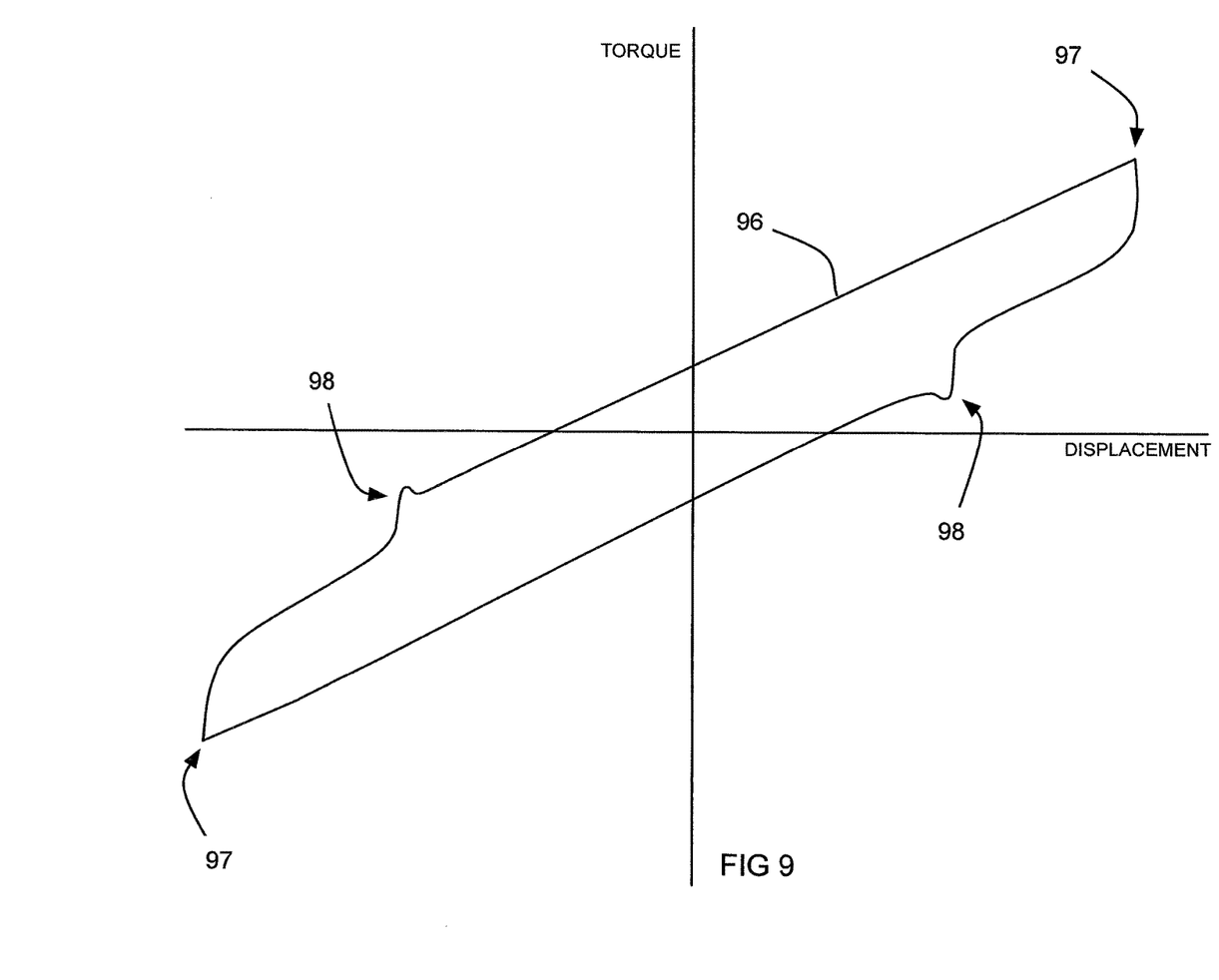

FIG. 9 is a graph that illustrates the torque/displacement curve for the isolator 10. As can be seen, the curve 96 extends through a loop based on the amount of damping generally provided from whatever sources of damping are present in the isolator 10, such as, friction associated with the friction ring 74, friction between the isolator springs 22 and the spring shell 64, and friction at the bushing 36 during rotation of the pulley 18 thereon. The points 97 are the points where the driver 20 changes direction relative to the pulley 18. At these points, the driver 20 disengages from the friction ring 74 and then begins to rotate in the opposite direction, at which point the friction ring 74 is no longer applying a damping force. As can be seen, there are transition points shown at 98, which are the points where, after the driver 20 has changed direction relative to the pulley 18, the clearance G is used up and the driver 20 reengages the opposing engagement face of the friction ring 74. At this point, the total damping force being applied increases substantially instantaneously.

While the above description constitutes a plurality of embodiments of the present invention, it will be appreciated that the present invention is susceptible to further modification and change without departing from the fair meaning of the accompanying claims.

The invention claimed is:

1. An isolator for isolating torsional vibration between a crankshaft of an engine and an endless drive member, comprising:
    a driver drivable by the crankshaft;
    a pulley that is engageable with an endless drive member;
    at least one isolation spring that is positioned to transfer forces between the driver and the pulley and to isolate torsional vibrations in the driver and the pulley from one another; and
    a damping structure configured to frictionally resist relative movement between the driver and the pulley beyond a selected relative threshold angle, and to permit relative movement between the driver and the pulley within the selected relative threshold angle without frictional resistance from the damping structure.

2. An isolator as claimed in claim 1, wherein the at least one isolation spring includes first and second helical coil compression springs.

3. An isolator as claimed in claim 1, wherein the damping structure includes a friction ring that has a radially inner surface that is frictionally engaged with a radially outer surface of the pulley, and that includes a first driver engagement face and a second driver engagement face which are engageable with a first damping structure engagement face and a second damping structure engagement face on the driver.

4. An isolator as claimed in claim 3, wherein the at least one isolation spring includes first and second helical coil compression springs, wherein the driver has a first driver arm and a second driver arm, wherein the first and second driver arms have a first spring engagement surface positioned for engagement with the first end of each of the first and second springs, and a second spring engagement surface positioned for engagement with the second end of each of the first and second engagement springs.

5. An isolator as claimed in claim 1, wherein the selected relative threshold angle is between about 7 and about 8 degrees.

6. An isolator as claimed in claim 1, wherein the selected relative threshold angle is selected to be larger than half of an amplitude of movement of the driver relative to the pulley due to torsional vibration during idling of the engine.

7. An isolator as claimed in claim 1, wherein the driver has a damping structure engagement face and wherein the damping structure includes a friction member positioned to frictionally resist relative movement between the driver and the pulley, wherein there is a selected clearance between the friction member and the damping structure engagement face.

8. An isolator as claimed in claim 1, wherein the selected threshold angle is selected based on an amplitude of movement of the driver relative to the pulley due to torsional vibration during idling of the engine.

9. An isolator as claimed in claim 1, further comprising a spring shell that at least partially surrounds the at least one isolation spring, wherein the spring shell includes a first spring shell portion and a second spring shell portion, wherein each spring shell portion includes a spring shell portion body at least one clip member and at least one clip receiving shoulder positioned 180 degrees from the at least one clip member and configured to lockingly receive the at least one clip member from the other spring shell portion.

10. An isolator as claimed in claim 9, wherein the spring shell is surrounded by the pulley on two axial sides and is made from a material that undergoes thermal expansion relative to the pulley to increase the adherence of the spring shell to the pulley during operation thereof.

11. An isolator for isolating torsional vibration between an input member and an output member, comprising:
a first rotary drive member that is engageable with one of the input and output members;
a second rotary drive member that is engageable with the other of the input and output members;
at least one isolator spring, wherein the first rotary drive member engages one end of at least one isolation spring and the second rotary drive member engages the other end of the at least one isolation spring such that torque is transmitted between the first rotary drive member and the second rotary drive member through the at least one isolation spring; and
a spring shell that at least partially surrounds the at least one isolation spring, wherein the spring shell includes a first spring shell portion and a second spring shell portion, wherein each spring shell portion includes a spring shell portion body at least one clip member and at least one clip receiving shoulder positioned 180 degrees from the at least one clip member and configured to lockingly receive the at least one clip member from the other spring shell portion.

12. An isolator as claimed in claim 11, wherein the spring shell is surrounded by the second rotary drive member on two axial sides and is made from a material that undergoes sufficient thermal expansion relative to the second rotary drive member to increase the adherence of the spring shell to the second rotary drive member during an increase in temperature of the isolator during operation thereof.

13. An isolator for isolating torsional vibration between an input member and an output member, comprising:
a first rotary drive member that is engageable with one of the input and output members;
a second rotary drive member that is engageable with the other of the input and output members;
at least one isolation spring that is positioned to transfer forces between the first and second rotary drive members and to isolate torsional vibrations in the first and second rotary drive members from one another; and
a damping structure configured to frictionally resist relative movement between the first and second rotary drive members that is beyond a selected relative threshold angle, and to permit relative movement between the first and second rotary drive members within the selected relative threshold angle without frictional resistance from the damping structure.

14. An isolator as claimed in claim 13, wherein the input member is a crankshaft of the engine and the output member is an accessory drive belt.

* * * * *